United States Patent

Hughes-Hartogs

[11] Patent Number: 5,854,829
[45] Date of Patent: Dec. 29, 1998

[54] ISDN FAX ROUTING

[75] Inventor: Dirk Hughes-Hartogs, Morgan Hill, Calif.

[73] Assignee: Canon Kabushiki Kaisha, Tokyo, Japan

[21] Appl. No.: 818,324

[22] Filed: Mar. 14, 1997

Related U.S. Application Data

[63] Continuation-in-part of Ser. No. 458,892, Jun. 2, 1995, Pat. No. 5,657,381.

[30] Foreign Application Priority Data

Apr. 30, 1996 [EP] European Pat. Off. ............ 963030168

[51] Int. Cl.$^6$ .................................................. H04M 11/00
[52] U.S. Cl. ...................... 379/100.12; 358/443; 358/468
[58] Field of Search ........................ 379/100.12, 100.01, 379/100.06–100.09, 93.14, 93.24, 93.25, 93.05–93.08; 358/442, 443, 400–403, 405, 407

[56] References Cited

U.S. PATENT DOCUMENTS

| | | | |
|---|---|---|---|
| 5,410,416 | 4/1995 | Amberg et al. | 358/405 |
| 5,450,486 | 9/1995 | Maas et al. | 379/94 |
| 5,481,598 | 1/1996 | Bergler et al. | 379/94 |
| 5,555,294 | 9/1996 | Abe | 379/94 |
| 5,657,381 | 8/1997 | Hughes-Hartogs | 379/100.12 |

FOREIGN PATENT DOCUMENTS

| | | | |
|---|---|---|---|
| 0 545 552 A1 | 6/1993 | European Pat. Off. | H04N 1/32 |
| 03126359 | 5/1991 | Japan | H04N 1/00 |
| 04154243 | 5/1992 | Japan | H04L 12/54 |
| 07038604 | 2/1995 | Japan | H04L 12/54 |
| 07058898 | 3/1995 | Japan | H04N 1/00 |
| 07123231 | 5/1995 | Japan | H04N 1/32 |

OTHER PUBLICATIONS

Schmid R., "ISDN—Von Der Theorie Zur Praxis", Elektrotechnik und Informationstechnik (E&I), vol. 110, No. 9, pp. 466–473, 1993, Vienna, Austria.

Primary Examiner—Wing F. Chan
Attorney, Agent, or Firm—Fenwick & West LLP

[57] ABSTRACT

Apparatus for efficiently routing facsimiles to and from a plurality of facsimile devices (62,64,66). At least one BRI line (16) is coupled to several ISDN terminals (21–28). At least one multiplexer (31,32) is coupled to the outputs of the terminals (21–28). A fax server (50) is coupled to the outputs of the multiplexers (31,32), typically via fax process computers (41,42). Coupled to the fax server (50) are a plurality of facsimile devices (62,64,66), each having a unique fax number. A given facsimile device (62,64,66) may send or receive more than one facsimile simultaneously by means of programming its fax number into more than one terminal (21–28) address. A terminal (21–28) may be coupled to more than one multiplexer (31,32). Multiple BRI lines (16) may be used. The fax server (50) preferably contains an incoming generic module (51) that interacts with all incoming facsimiles, an incoming specific module (53) that interacts with facsimiles destined for selected ones of the facsimile devices (62,64,66), an outgoing generic module (52) that interacts with all outgoing facsimiles, and an outgoing specific module (54) that interacts with outgoing facsimiles that emanate from selected ones of the facsimile devices (62,64,66).

10 Claims, 5 Drawing Sheets

ISDN FAX ROUTING

RELATED APPLICATION

This application is a continuation-in-part of U.S. patent application Ser. No. 08/458,892 filed Jun. 2, 1995 now U.S. Pat. No. 5,657,381.

TECHNICAL FIELD

This invention pertains to the field of efficiently routing facsimiles to and from a plurality of facsimile devices, in an environment using ISDN telephone lines. (Note: a Definitions Section follows the Brief Description of the Drawings.)

BACKGROUND ART

Figure 1:
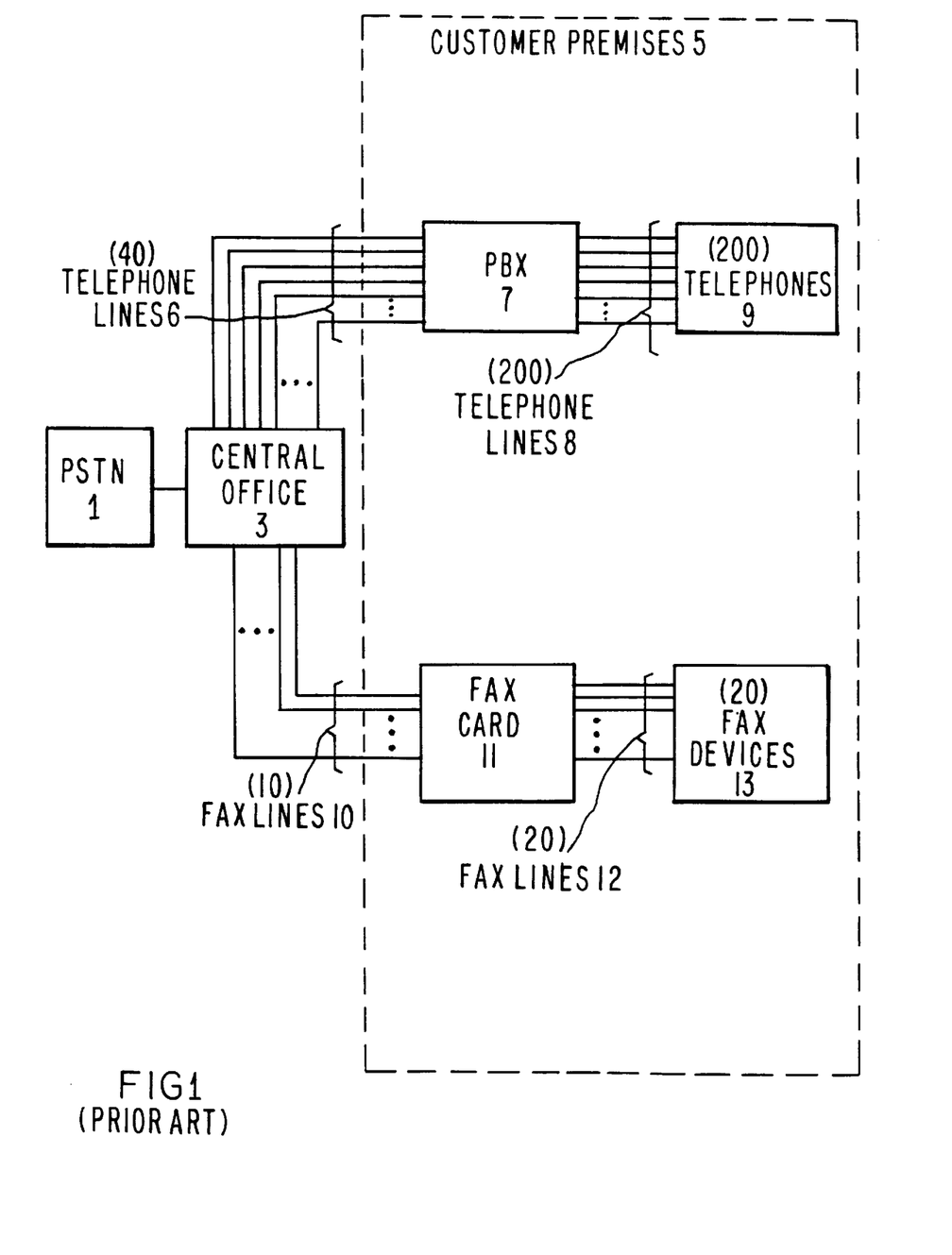
FIG. 1 is a block diagram of the first prior art system discussed above.

A conventional method of sending a plurality of facsimiles to a plurality of facsimile devices is illustrated in FIG. 1. This is a DID system, which is capable of handling incoming telephone calls and facsimiles, but not outgoing calls and facsimiles in the absence of additional lines. It is typically used in an analog (POTS) environment. This technique allows a relatively large number of users 9,13 to share a relatively small number of telephone lines. Each user (telephones 9 and fax devices 13) is assigned an individual number, for example, NXX-XDDD. Numbers NXX-X000 through NXX-X199 share a bank of, e.g., 40 telephone lines 6; and numbers NXX-X200 through NXX-X220 share a bank of 10 fax lines 10. These lines 6,10 are unusual in that CO 3 plays the role normally taken by the user 9,13, that of lifting a receiver and dialing a number; and the user 9,13 takes the role normally assumed by CO 3, namely, providing a 48 volt battery and a dial tone, and directing calls based upon digits dialed by another.

Calls may be sent to DID recipients 9,13 from either traditional (POTS) or new technology (ISDN) callers. In both cases, the DID technology is hidden from the caller, since the caller simply dials a NXX-XDDD or NPA-NXX-XDDD number.

Generally, when someone from within PSTN 1 dials a 7-digit DID number, CO 3 looks at the first 4 digits and determines that the particular customer 5 is the desired recipient of the call. CO 3 then arbitrarily selects one of the available lines 6,10, depending upon whether the dialed number is assigned a voice or facsimile function, respectively. PBX 7 or fax card 11 then gives a dial tone to CO 3; then PBX 7 or fax card 11 connects the caller to the appropriate device 9,13 based upon the last 3 digits of the telephone/fax number.

In the system illustrated in FIG. 1, 40 telephone lines 6 between the customer premises 5 and CO 3 handle 200 internal telephones 9 connected to customer-installed PBX 7 via 200 telephone lines 8; and 10 fax lines 10 connecting CO 3 and customer-installed fax card 11 handle 20 facsimile devices 13 coupled to fax card 11 via 20 fax lines 12.

The prior art system illustrated in FIG. 1 is limited, particularly for facsimile applications, because:

1. It is usually an analog system rather than a digital one.
2. It requires special customer equipment 7,11 and non-standard and expensive lines 6,10 from the telephone company. Telephones 9 and facsimile devices 13 must also be special, because they need to generate 48 volts, plus have the ability to understand DTMF.
3. It does not allow the lines 6,8,10,12 to be used for outgoing calls when they are not being used for incoming calls. Separate lines are necessary.
4. It requires a high degree of maintenance.

In a second method of the prior art, traditional POTS lines which are not DID may be used to route PBX or fax calls if an extension number is appended to a seven or ten-digit telephone/fax number by the caller. In this situation, the caller dials the number, pauses while the PBX or fax card answers, then enters the extension number, generally in response to a dial tone or other prompt such as a recorded voice message. This method is similar to the old-fashioned method of reaching an employee of a company by telling a live or automated PBX attendant the extension desired.

Drawbacks to this method include:

1. Delay.
2. This system may not be able to handle incoming calls from an automated calling device.
3. There are no standard protocols for implementing this system.

In a third system of the prior art, calls between ISDN customers may be routed using the digital sub-addressing feature of ISDN technology to obtain the individual extension of the desired recipient. Digital sub-addressing allows additional digits to be exchanged between customer end points during the "hand-shaking" which occurs between those end points at the beginning of each call. This method, however, has the following limitations:

1. The customers on both ends of the connection must be using ISDN equipment. No provision is made for analog POTS customers calling ISDN recipients.
2. Not all ISDN services as implemented by individual telephone companies allow sub-addressing.

Disclosure of Invention

The above defects of the prior art are remedied by the present invention, which enables personalized facsimiles to be sent to a plurality of facsimile devices (62,64,66). The present invention assures privacy of the communications, in that only the intended recipient is able to view the facsimile. The present invention allows an individual facsimile device (62,64,66) to send or receive facsimiles to/from more than one caller simultaneously. Furthermore, the present invention allows the facsimile device (62,64,66) to send outgoing facsimiles through the system without the need for additional telephone lines.

The present invention is a set of apparatus comprising at least one ISDN BRI line (16). Associated with each BRI line (16) are several ISDN terminals (21–28), each terminal having an input coupled to the BRI line (16) and an output. At least one multiplexer (31,32) is coupled to the outputs of the terminals (21–28). Each multiplexer (31,32) has at least two inputs coupled to the terminals (21–28) and one output. A fax server (50) is coupled to the outputs of the multiplexers (31,32). A plurality of facsimile devices (62,64,66) are coupled to the fax server (50). Each facsimile device (62, 64,66) has a unique fax number.

BRIEF DESCRIPTION OF THE DRAWINGS

These and other more detailed and specific objects and features of the present invention are more fully disclosed in the following specification, reference being had to the accompanying drawings, in which.

DEFINITIONS

The following terms used in the instant specification have the following meanings:

"BRI" means basic rate interface. It is an ISDN term. A BRI line 16 is normally implemented as an unshielded twisted pair of copper wires. A BRI line 16 can accommodate two B channels each at 64 Kbps (normally carrying data) and one D channel at 16 Kbps. The D channel can accommodate a small amount of data, but is normally used for signaling.

"CO" means central office 3 of a telephone company.

"DID" means direct-inward-dialing.

"DTMF" means dual-tone multi-frequency.

"E-mail" means electronic mail, a computerized distribution and storage system for sending messages from one computer to another.

"FCC" means Federal Communications Commission.

"Incoming" means a facsimile that emanates from PSTN 1 and is directed to one of facsimile devices 62,64,66.

"ISDN" means integrated services digital network, a telephone service promulgated internationally by the ITU, national PTT's, AT&T, Lucent Technologies, RBOCs, and other major telecommunications organizations.

"ISDN terminal" means a terminal 21–28 that is on the premises 5 of a customer and that is capable of operating with an ISDN connection.

"LAN" means local area network 63, a network of computers that are physically proximal.

"Mux" means multiplexer. A multiplexer can normally function as a demultiplexer when the data flow through the device is reversed.

"Outgoing" means a facsimile that originates with one of facsimile devices 62,64,66 and is destined for a recipient connected to PSTN 1.

"PBX" means private branch exchange 7, a telephone switching device located on customer premises 5.

"POTS" means plain old telephone service, i.e, the analog telephone system in place throughout most of the world currently.

"PSTN" means public switched telephone network 1.

"WAN" means wide area network 65, a network of computers that are physically distal.

DETAILED DESCRIPTION OF THE PREFERRED EMBODIMENTS

Figure 2:
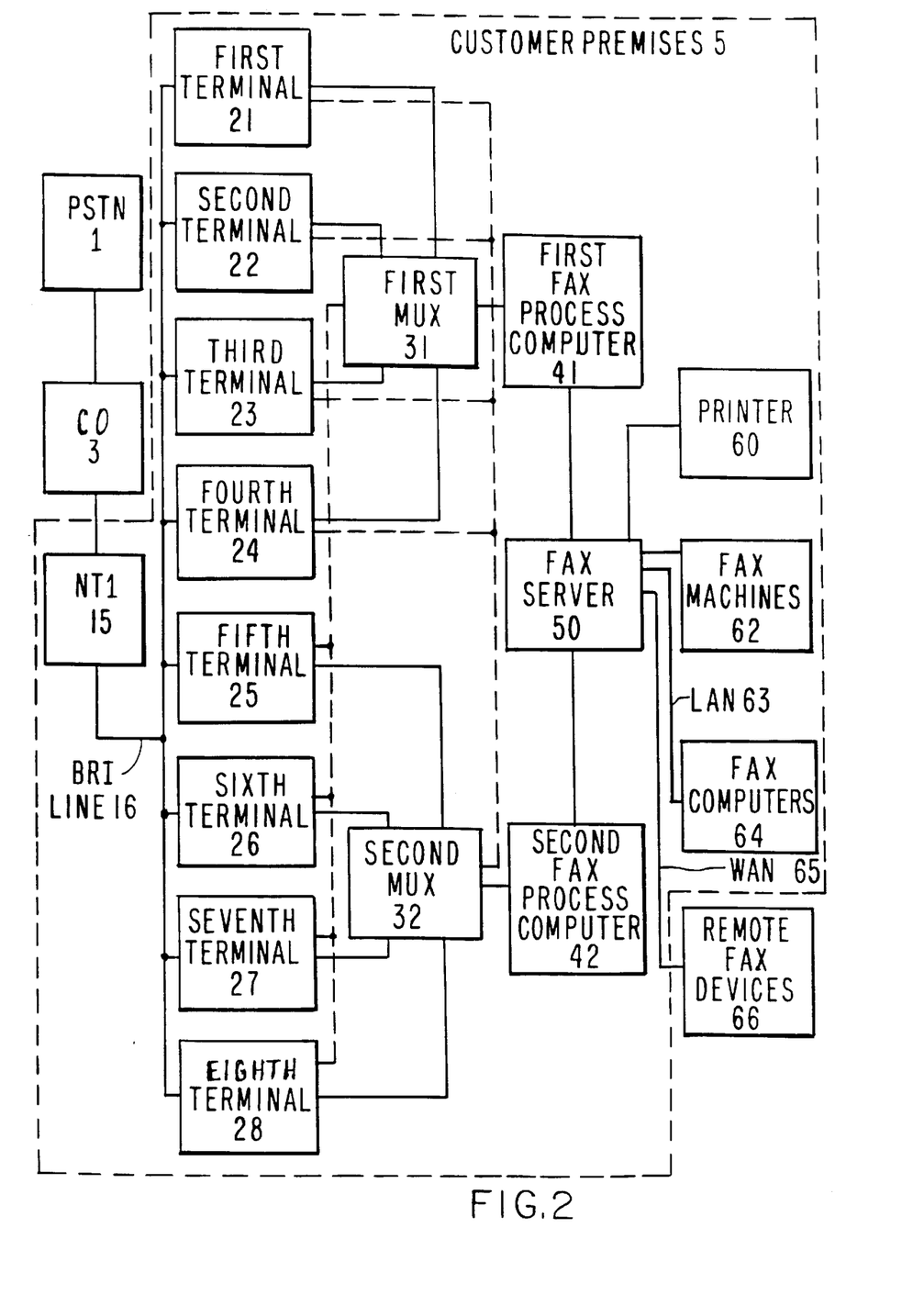
FIG. 2 is a block diagram of a preferred embodiment of the present invention, in which a single BRI line 16 is employed.

FIG. 2 describes a first preferred embodiment of the present invention in which a single BRI line 16 is employed.

Since BRI line 16 contains two B channels, two facsimiles can travel through line 16 simultaneously and independently. These facsimiles must be processed by two different terminals 21–28. BRI line 16 is coupled to CO 3 via NT1 15, a standard ISDN conversion device. Alternatively, an organization other than the telephone company could supply BRI line 16, with an appropriate converter providing the user interface supplied by NT1 15.

BRI line 16 is shown coupled to eight terminals 21–28. A typical limitation of existing ISDN is that no more than eight devices can be coupled to a single BRI line 16. This is a limitation of the AT&T 5-ESS switch, a standard ISDN component. Each terminal 21–28 has its own unique terminal identifier. These eight terminals 21–28 can be merged onto a single card and indeed a single physical device. ISDN terminals 21–28 are made by a number of manufacturers, including AT&T, Lucent Technologies, IBM, and Motorola.

In standard ISDN, each terminal 21–28 typically has one or two telephone numbers, each with one or two call appearances, for a total of one to four addresses (call appearances) per terminal 21–28. However, by making special arrangements with CO 3, up to sixty-four addresses can be programmed into each said terminal 21–28 and be recognized by CO 3. Normally, no more than sixty-four call appearances can be programmed into a single terminal 21–28. This is also a limitation of the AT&T 5-ESS switch. As billed by the local telephone company, each telephone number that is programmed into terminal 21–28 typically costs the user approximately $2 per month in 1995 economics. The BRI line 16 itself typically costs about $25 per month, and the connection of each terminal 21–28 typically costs about $4 per month. Each facsimile device 62,64,66 has its own unique fax number (address). These fax numbers are programmed into terminals 21–28. If a given fax number is programmed into only one terminal 21–28, the system illustrated in FIG. 2 can accommodate 512 different facsimile devices 62,64,66 (8 terminals 21–28 times 64 devices per terminal).

A given fax number may be programmed into more than one terminal 21–28. This is normally done when the associated facsimile device 62,64,66 sends and/or receives a large number of facsimiles. The number of facsimiles that can be so handled by the given device 62,64,66 is equal to the number of addresses into which the fax number of the given device 62,64,66 is programmed. Several high-usage facsimile devices 62,64,66 may have their fax numbers programmed into more than one terminal 21–28. This can be done in rough proportion to the frequencies of facsimiles sent and/or received by said high-usage facsimile devices 62,64,66. Said frequencies can be obtained from historical (empirical) data.

There is no need that the fax numbers that are programmed into the terminals 21–28 be consecutive, unlike the case with DID. If a given facsimile device 62,64,66 has its fax number programmed into two terminal 21–28 addresses, then two facsimiles can be confidentially and simultaneously routed to that facsimile device 62,64,66. The third simultaneous caller will receive a busy signal, but will be able to send his/her facsimile as soon as the transmission of one of the first two facsimiles has been completed.

For each terminal 21–28, one of the fax numbers programmed into said terminal 21–28 is considered to be the "primary number" for said terminal 21–28, and to some extent identifies said terminal 21–28. This fax number may appear as a call appearance on other terminals 21–28, but may not be the primary number for any of such terminals 21–28.

Each terminal 21–28 has a single input coupled to BRI line 16. The outputs of terminals 21–28 are multiplexed using one or more muxes 31,32. There are normally two muxes 31,32, corresponding to the two B channels in BRI line 16. In the embodiment illustrated in FIG. 2, two muxes 31,32 are used. The solid lines in FIG. 2 illustrate a first embodiment in which each mux 31,32 is connected to four terminals, 21–24 and 25–28, respectively. A variation of this embodiment is that each mux 31,32 could be connected to a different number of terminals 21–28. This is normally done based upon usage, e.g., if the fax numbers programmed into terminal 21 receive (or send) an unusually high number of facsimiles. For example, mux 31 could be combined to just terminal 21 and mux 32 combined to the seven terminals numbered 22–28.

In a second mux embodiment, illustrated by the dashed lines in FIG. 2, each mux 31,32 is connected to all eight terminals 21–28. In this embodiment, the muxes 31–32 select which terminal 21–28 they communicate with, based upon usage. This permits a dynamic allocation of terminals 21–28 based upon actual conditions.

Figure 5:
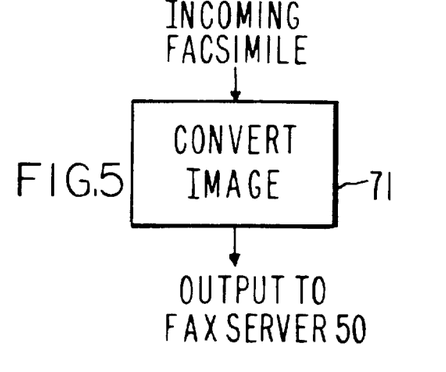
FIG. 5 is a flow diagram showing the processing performed by fax process computer 41,42 on an incoming facsimile.
Figure 6:
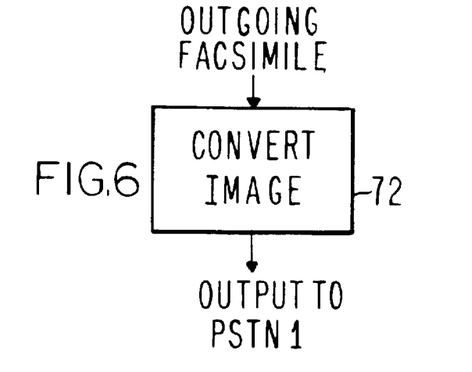
FIG. 6 is a flow diagram showing the processing performed by fax process computer 41,42 on an outgoing facsimile.

The outputs of muxes 31–32 are typically fed to fax process computers 41,42 respectively. As shown in FIG. 5, computers 41,42 receive each incoming facsimile (typically in G3 or G4 format), and convert (step 71) this image into a format that the recipient facsimile device 62,64,66 recognizes. For outgoing facsimiles, as shown in FIG. 6, computers 41,42 ensure that the recipient of the facsimile within PSTN 1 can recognize the format used by the originating facsimile device 62,64,66, by doing an image conversion (typically into G3 or G4 format) at step 72.

Computers 41,42 are connected to fax server 50, a computer that can be programmed to provide many functions, e.g., formatting facsimiles into any particular chosen format, compiling accounting information, placing date and time stamps onto the facsimiles, providing and formatting header information, and distributing facsimiles based upon the three-digit address that has been originated by the sender of the facsimile. Fax server 50 can also introduce delays in the sending and forwarding of incoming and outgoing facsimiles, and can change the physical location of the recipient 62,64,66, e.g., if the recipient's owner is on vacation, so that person's facsimiles will be delivered to a different physical location.

A printer 60 may be connected to fax server 50 to provide a hard copy of facsimiles that are processed by server 50. This can e done for archival, verification, and/or security purposes. Accounting information can also be printed on printer 60. Display 59 may also be connected to server 50 (see FIG. 4). The facsimile devices may be located on customer premises 5, e.g., facsimile machines 62 and computers 64 having facsimile software. Computers 64 may be coupled to each other and to fax server 50 via LAN 63. In that case, the fax numbers associated with computers 64 can be the same as the E-mail addresses of said computers 64, and one of the functions of server 50 can be to translate to make sure that the correct E-mail format is used. The present invention offers the same level of security as regular E-mail. Fax server 50 acts as any other originator of E-mail. Encryption can be used for additional security.

In addition to facsimile devices 62,64 located within customer premises 5, similar devices 66 may exist outside of premises 5 in any location in the world. Devices 66 may be standalone facsimile machines and/or computers having facsimile software. They may be connected to server 50 via a wired or wireless link (such as PSTN 1 or WAN 65).

Figure 3:
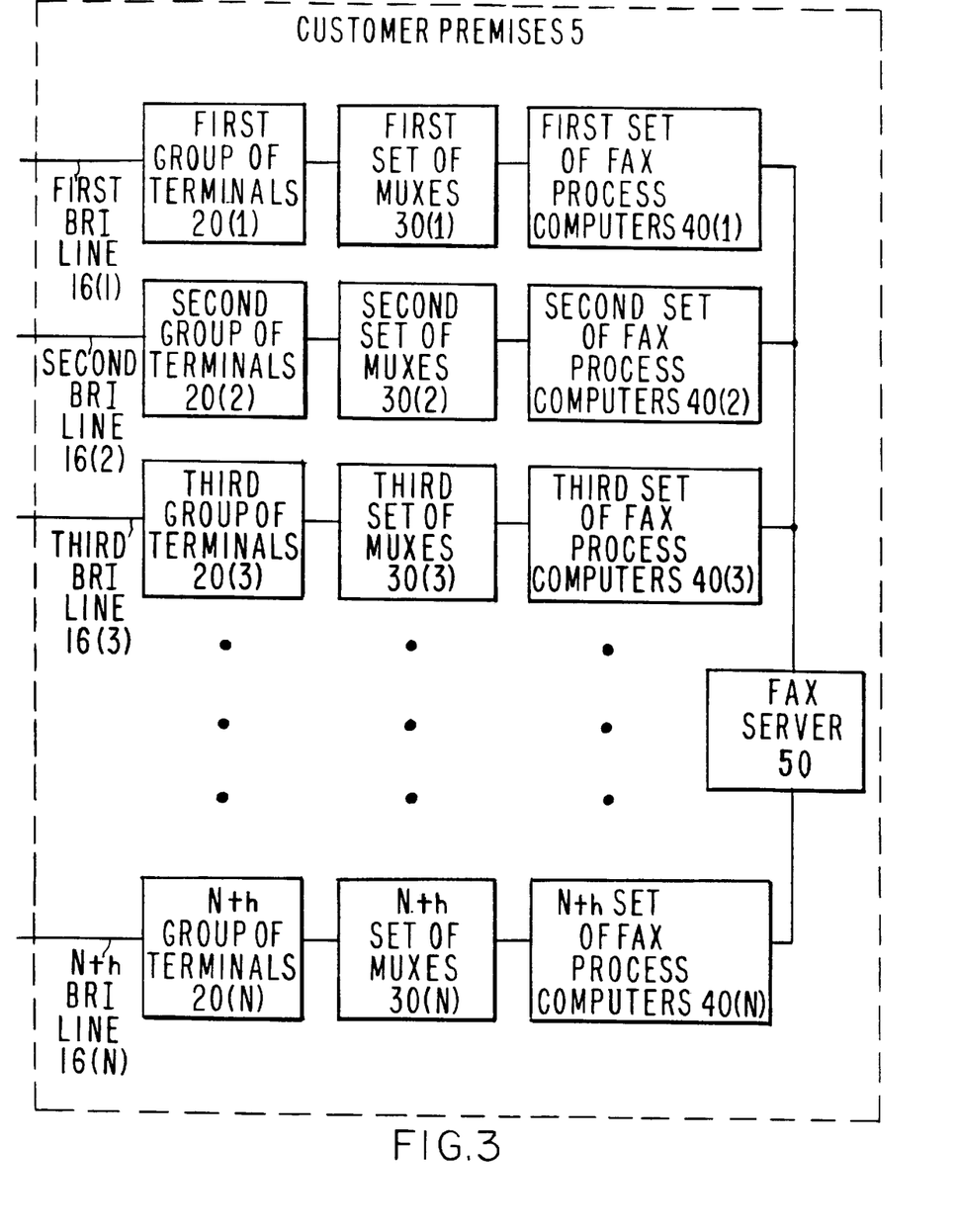
FIG. 3 is a block diagram of a preferred embodiment of the present invention in which N BRI lines 16 are employed.

In an alternative embodiment of the present invention illustrated in FIG. 3, N BRI lines 16 are employed, where N is any positive integer. As illustrated, terminals 20, muxes 30, and fax process computers 40 are duplicated for each BRI line 16 as in the FIG. 2 embodiment; but a single fax server coupled to the outputs of all fax process computers 40 is all that is necessary. The remainder of the apparatus is as shown in FIG. 2. Since each BRI line 16 can accommodate two simultaneous faxes, the embodiment illustrated in FIG. 3 can accommodate 2N individual faxes simultaneously. As before, any given facsimile device 62,64,66 may have its fax number programmed into more than one terminal 20, or into more than one address on the same terminal 20. Thus, it is theoretically possible (although not very useful) for all 2N simultaneous faxes to be sent to or emanate from the same facsimile device 62,64,66. If a given facsimile device 62,64,66 has its fax number programmed into J terminal 21–28 addresses, then J facsimiles can be confidentially and simultaneously routed to that facsimile device 62,64,66. The (J+1)st simultaneous caller will receive a busy signal, but will be able to send his/her facsimile as soon as the transmission of one of the first J facsimiles has been completed.

In the FIG. 3 embodiment, some or all of the terminals 20 can be combined onto a single card that is coupled to some or all of the BRI lines 16.

Figure 4:
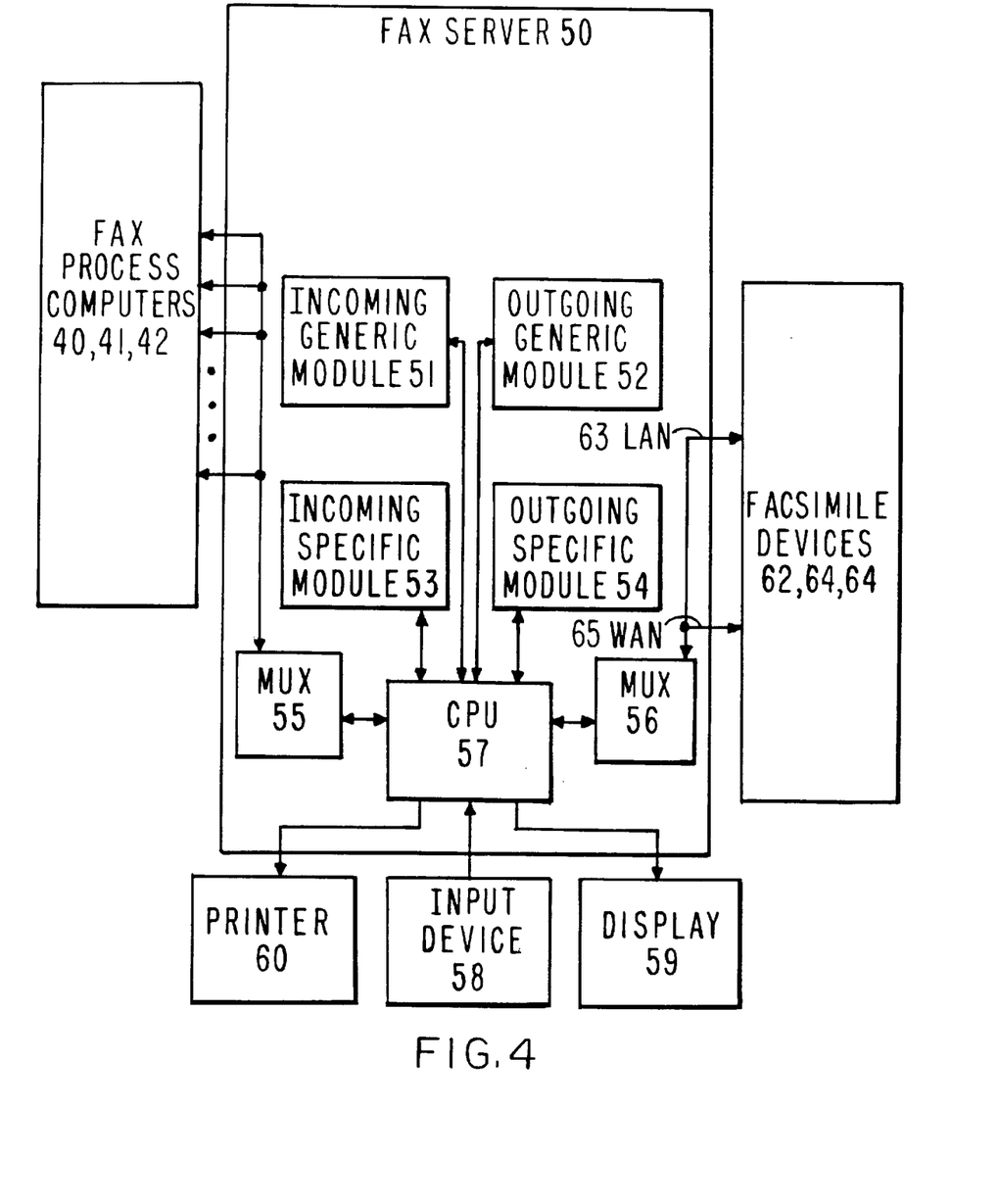
FIG. 4 is a block diagram of fax server 50 of the present invention, showing its constituent elements.

FIG. 4 illustrates the internal architecture of fax server 50. In those embodiments where there is more than one fax process computer 40,41,42, mux 55 is positioned between fax process computers 40,41,42 and the central processing unit (CPU) 57 of fax server 50. Mux 55 acts as a multiplexer for incoming facsimiles and as a demultiplexer for outgoing facsimiles. Similarly, mux 56 is positioned between CPU 57 and facsimile devices 62,64,66. Mux 56 acts as demultiplexer for incoming facsimiles and as a multiplexer for outgoing facsimiles.

Modules 51,52,53, and 54 are pieces of random access memory (RAM) or other storage devices, and are each in bidirectional contact with CPU 57. Also associated with CPU 57 may be a working storage area including RAM and/or disk memory. The purpose of modules 51–54 is to direct the performance of certain processing on the incoming and outgoing facsimiles. The actual processing is determined by the system administrator, who inputs information concerning the desired processing to the modules 51–54 via CPU 57 and input device 58, which can comprise, for example, a keyboard plus mouse or trackball. The system administrator monitors the programming of CPU 57 and modules 51–54 via an output device, such as display 59, coupled to CPU 57.

Figure 7:
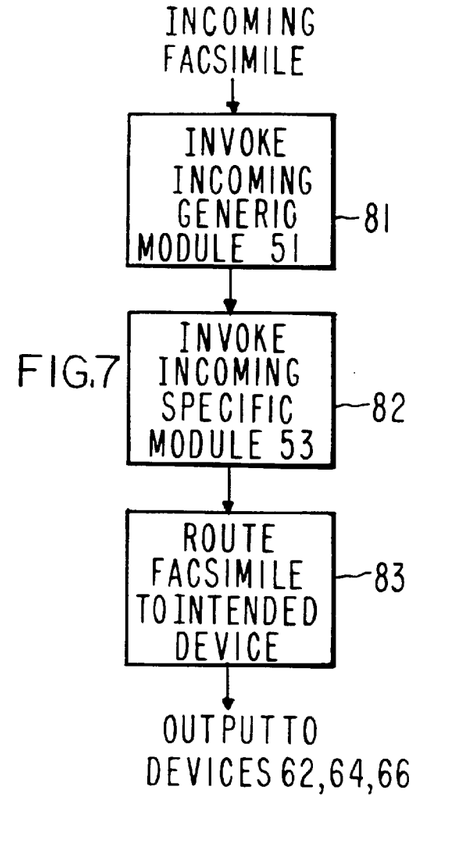
FIG. 7 is a flow diagram showing the processing performed by CPU 57 on an incoming facsimile.

As shown in FIG. 7, incoming generic module 51 is invoked by CPU 57 for every incoming facsimile at step 81. Examples of processing that can be programmed into module 51 include collecting accounting and usage data; formatting each incoming facsimile into any particular chosen format, paying attention to margins, page numbers, line numbers, etc.; placing a date/time stamp on each incoming facsimile; placing onto each incoming facsimile header information concerning the identity of the sender of the facsimile; etc. Accurate date and time information can be obtained from CO 3.

After CPU 57 has performed the generic processing for each incoming facsimile, CPU 57 checks at step 82 to see whether the three-digit address of the intended recipient 62,64,66 is stored within incoming specific module 53, which can be organized as a look-up table, with the address of the table corresponding to the three-digit fax number and the contents of each table entry giving the specific desired pre-selected processing corresponding to said fax number. If the fax address is stored within module 53, specific processing is performed for that facsimile. Examples of individual processing specific to a given fax number can include any or all of the processing described above in conjunction with the description of incoming generic module 51; plus additional items such as re-routing the incoming facsimile to a different address if the recipient has indicated he/she is on vacation; delaying the facsimile for a given period of time; limiting the number of incoming facsimiles for that given recipient 62,64,66 for a given period of time, which may correspond to a certain time of the day; etc. Incoming specific module 53 may also be invoked for certain facsimiles based upon the identity of the sender, rather than the recipient. This is feasible if the sender has caller I.D.

After CPU 57 has performed the incoming generic processing and incoming specific processing as governed by modules 51 and 53, CPU 57 at step 83 routes the incoming facsimile to the intended facsimile device 62,64,66 based upon the three-digit fax number.

The processing of outgoing facsimiles is in substance the mirror-image of the processing of incoming facsimiles discussed above, and is illustrated in FIG. 8. CPU 57 invokes outgoing generic module 52 for every outgoing facsimile at step 85. The processing instructions contained within module 52 can thus instruct CPU 57 to format the outgoing facsimile in a certain manner; keep track of accounting information, such as length of the facsimile, destination; etc. This accounting information is normally based on the fax number of the sending device 62,64,66, and can be printed on printer 60. Another example of outgoing processing instructions might be to delay the sending of a group of facsimiles until the middle of the night (to take advantage of lower telephone charges) when a large number of facsimiles are being sent at one time.

Figure 8:
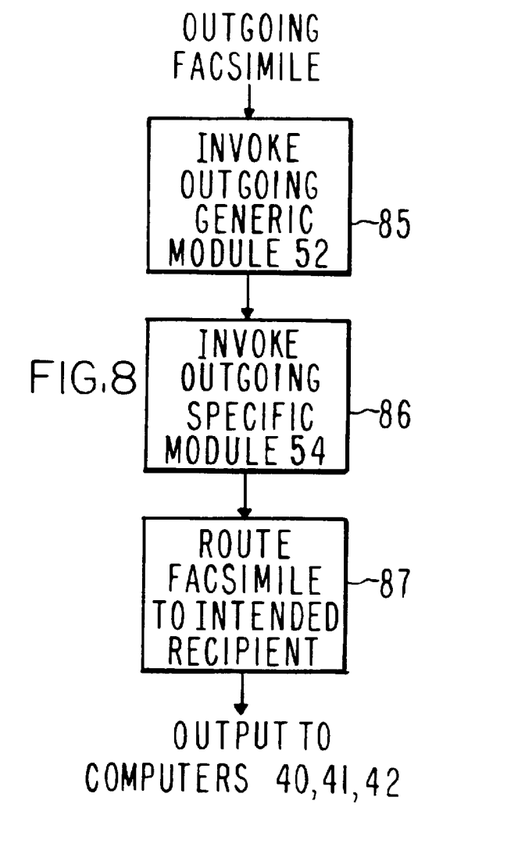
FIG. 8 is a flow diagram showing the processing performed by CPU 57 on an outgoing facsimile.

Similarly, CPU 57 checks at step 86 the sender's fax number to see whether it is stored within outgoing specific module 54, which can also be organized as a look-up table. If said fax number is present, specific processing instructions associated with that originating facsimile device 62,64, 66 will be retrieved from module 54 and performed by CPU 57. For example, a certain sender 62,64,66 might not be allowed to send facsimiles outside a certain geographical region, such as the country of origin. In that case, CPU 57 will abort the sending of said facsimiles. Module 54 can also be programmed to contain specific processing instructions for certain facsimiles based upon the identity of the intended recipient within PSTN 1, rather than the originator 62,64,66. For example, if the intended recipient is in a certain geographical location, such as in a country other than the country of origin, CPU 57 may be instructed to place certain calling codes into the dialing sequence, to facilitate the transmission of said facsimile.

After the processing associated with outgoing specific module 54 has been completed, CPU 57 at step 87 routes the facsimile to the intended recipient within PSTN 1 via optional mux 55 and fax process computers 40, 41, 42.

While the use of the present invention is not limited by technology restrictions on CO 3, it is worthwhile to note that what telephone companies offer may be less than what they can achieve technically, because of marketing decisions, and, more importantly, limiting arrangements called tariffs reached with government regulatory bodies, including state public utility commissions and the FCC. These tariffs often provide legal and economic disincentives to innovation. The present invention is believed to be generally usable in the United States, although the particular numbers of terminals 21–28, numbers of addresses per terminal 21–28, and costs may vary.

The above description is included to illustrate the operation of the preferred embodiments, and is not meant to limit the scope of the invention. The scope of the invention is to be limited only by the following claims. From the above discussion, many variations may be apparent to one skilled in the art that would yet be encompassed by the spirit and scope of the invention.

For example, in a first alternate embodiment, terminals 21 and 22 are connected directly to first fax process computer 41 and second fax process computer 42, respectively, with first mux 31 and second mux 32 either locked or eliminated. Terminals 23–28 exist conceptually in the customer premises 5 but have no physical or virtual embodiment subsequent to a brief initialization process.

Each directory number corresponds to a single fax recipient 62,64,66 and has only a single call appearance on one of the terminals 21–28. Additionally, each directory number is forwarded to a single main fax number. The single main fax number has one call appearance on each first terminal 21, as well as each second terminal 22, for each BRI line 16. These call appearances are members of a hunt group comprising two members for each customer premises 5. Calls to any directory number on any terminal 21–28, either real (21–22) or conceptual (23–28), will ultimately arrive at the main fax number hunt group and, in particular, on the first non-busy member of that hunt group.

The CO 3 transmits information to the terminals 21,22 regarding the forwarding process, which allows the fax server 50, as well as the fax process computers 41,42, to know, for each call to the main fax number, whether that call was made directly to said number or was forwarded. Further, if the call was forwarded from some other call appearance directory number on terminals 21–28, the original called number is known.

Note that this method allows a multiplicity of calls, up to the total number of members in the hunt group, without individual restrictions on the number of faxes an individual number may receive. (For economic and technical reasons, a "centrex" tariff is generally preferred for this implementation.)

In other alternative embodiments, there are numerous possible methods to accomplish fax routing, using call transfer, call forwarding, and shared call appearances.

I claim:

1. A method for routing incoming facsimiles arriving over an ISDN line to a plurality of facsimile devices, said method comprising the steps of:

invoking an incoming generic module that interacts with all incoming facsimiles;

invoking an incoming specific module that interacts with incoming facsimiles that are addressed to selected ones of said facsimile devices; and routing said incoming facsimiles to intended ones of said facsimile devices.

2. The method of claim 1, wherein the step of invoking the incoming generic module entails performing at least one of the following substeps:

collecting accounting and usage data;

formatting the incoming facsimiles into a chosen format;

placing a date/time stamp on the incoming facsimiles; and placing header information onto the incoming facsimiles.

3. The method of claim 1, wherein the step of invoking the incoming specific module comprises checking whether the address of the intended recipient is stored within the incoming specific module, and, if said address is so stored, performing at least one of the following substeps:

collecting accounting and usage data;

formatting the incoming facsimile into a chosen format;

placing a date/time stamp on the incoming facsimile;

placing header information on the incoming facsimile;

re-routing the incoming facsimile to a different address;

delaying the incoming facsimile for a given period of time; and limiting the number of incoming facsimiles for said intended recipient for a given period of time.

4. A method for routing outgoing facsimiles from a plurality of facsimile devices to intended recipients within a public switched telephone network over ISDN lines, the method comprising the steps of:

invoking an outgoing generic module for each outgoing facsimile;

invoking an outgoing specific module for selected ones of said outgoing facsimiles; and routing the outgoing facsimiles to the intended recipients within the public switched telephone network.

5. The method of claim 4, wherein the step of invoking the outgoing generic module comprises performing at least one of the following substeps:

formatting the outgoing facsimiles;

keeping track of accounting information; and delaying the sending of at least some of the outgoing facsimiles.

6. The method of claim 4, wherein the step of invoking the outgoing specific module comprises checking whether the sender's facsimile number is stored within said outgoing specific module, and if said facsimile number is so stored, performing at least one of the following substeps:

aborting the sending of outgoing facsimiles outside a certain geographical region; and performing specific processing instructions based upon the identity of the intended recipient.

7. A method for efficiently routing facsimiles to and from a plurality of facsimile devices, said method comprising the steps of:

providing at least one ISDN BRI line;

coupling to each BRI line several ISDN terminals, each terminal having an input coupled to the BRI line and an output;

coupling a fax server to the outputs of the ISDN terminals; and coupling a plurality of facsimile devices to the fax server, each facsimile device having a unique fax number.

8. The method of claim 7 further comprising the step of coupling at least one multiplexer to the outputs of the terminals, each multiplexer having an output and at least two inputs respectively coupled to at least two terminals; wherein the fax server is coupled to the output(s) of the multiplexer(s).

9. The method of claim 7, wherein said facsimile devices comprise at least one high-usage facsimile device, said method further comprising the step of programming the fax number of at least one high-usage facsimile device into more than one terminal address, whereby said high-usage facsimile device can receive and/or send more than one facsimile simultaneously.

10. The method of claim 7, wherein said facsimile devices comprise several high-usage facsimile devices, said method further comprising the step of programming the fax numbers of several high usage facsimile devices into more than one terminal address in rough proportion to the frequencies of facsimiles received and/or sent by said high-usage facsimile devices, wherein said frequencies are obtained from historical data.

* * * * *